United States Patent
Betts et al.

(10) Patent No.: US 7,526,493 B2
(45) Date of Patent: Apr. 28, 2009

(54) META-TAGGING IN CONTENT ROUTED NETWORKS

(75) Inventors: Craig Betts, Kanata (CA); David Pochopsky, Ottawa (CA); Martin Barnes, Kanata (CA); Greg Bertin, Ottawa (CA); Peter Ashton, Nepean (CA); Wayne Burwell, Ottawa (CA)

(73) Assignee: Solace Systems, Inc., Ottawa (CA)

( * ) Notice: Subject to any disclaimer, the term of this patent is extended or adjusted under 35 U.S.C. 154(b) by 354 days.

(21) Appl. No.: 11/012,168

(22) Filed: Dec. 16, 2004

(65) Prior Publication Data

US 2005/0138019 A1    Jun. 23, 2005

Related U.S. Application Data

(60) Provisional application No. 60/530,677, filed on Dec. 19, 2003.

(51) Int. Cl.
*G06F 7/00* (2006.01)
*G06F 17/00* (2006.01)
*G06F 15/173* (2006.01)
*G06F 17/30* (2006.01)
*H04L 12/28* (2006.01)
*H04L 12/56* (2006.01)

(52) U.S. Cl. .................. 707/100; 370/390; 370/392; 370/393; 707/10; 709/238; 709/240

(58) Field of Classification Search .................. None
See application file for complete search history.

(56) References Cited

U.S. PATENT DOCUMENTS

| 6,021,443 | A | | 2/2000 | Bracho et al. |
| 6,091,724 | A | | 7/2000 | Chandra et al. |
| 6,728,220 | B2 | * | 4/2004 | Behzadi ..................... 370/254 |
| 7,096,270 | B2 | * | 8/2006 | Abjanic et al. .............. 709/229 |
| 7,177,909 | B2 | * | 2/2007 | Stark et al. .................. 709/206 |
| 2002/0023172 | A1 | * | 2/2002 | Gendron et al. ............. 709/238 |
| 2002/0136204 | A1 | * | 9/2002 | Chen et al. .................. 370/352 |
| 2003/0099237 | A1 | * | 5/2003 | Mitra et al. ................. 370/393 |
| 2003/0195946 | A1 | * | 10/2003 | Yang .......................... 709/219 |
| 2003/0210694 | A1 | | 11/2003 | Jayaraman et al. |
| 2003/0237016 | A1 | * | 12/2003 | Johnson et al. ................ 714/4 |
| 2005/0021838 | A1 | * | 1/2005 | Levett ........................ 709/238 |

FOREIGN PATENT DOCUMENTS

WO    WO 03032626 A1    4/2003

(Continued)

OTHER PUBLICATIONS

Page 19 of the following web page (hereafter "Linode") published on Dec. 4, 2003: http://www.linode.com/irc/logs/linode.log-2003-12-04.*

(Continued)

*Primary Examiner*—Debbie M Le
*Assistant Examiner*—Harold A Hotelling
(74) *Attorney, Agent, or Firm*—Marks & Clerk; Richard J. Mitchell

(57) ABSTRACT

A method of adding meta-data to document in a content-routed network including a plurality of routers interconnected by links involves adding an encoded meta-tag to the document.

13 Claims, 2 Drawing Sheets

FOREIGN PATENT DOCUMENTS

WO      WO 03098485 A2      11/2003

OTHER PUBLICATIONS

Carzaniga, A. et al.; "A Routing Scheme for Content-Based Networking"; University of Colorado, Department of Computer Science Technical Report; Jun. 2003; Boulder, Colorado, U.S.A.

Arbouzov, L. et al.; "Extensible Markup Language (XML) 1.0 (Third Edition)"; Feb. 4, 2004; W3C.

Arbouzov, L. et al.; "Extensible Markup Language (XML) 1.1"; Apr. 15, 2004; W3C.

Berners-Lee, T. et al.; "Uniform Resource Identifiers (URI); Generic Syntax"; Aug. 1998; The Internet Society.

Berners-Lee, T. et al.: "Hypertext Transfer Protocol—HTTP/1.0"; May 1996.

Feilding, R. et al.; "Hypertext Transfer Protocol—HTTP/1.1"; Jun. 1999; The Internet Society.

* cited by examiner

META-TAGGING IN CONTENT ROUTED NETWORKS

CROSS REFERENCE TO RELATED APPLICATION

This application claims the benefit under 35 USC 119(e) of prior U.S. provisional application Ser. No. 60/530,677 filed Dec. 19, 2003, the contents of which are herein incorporated by reference.

FIELD OF THE INVENTION

This invention relates to content-routed networks, and in particular to a method of attaching meta-data to a message.

BACKGROUND OF THE INVENTION

Content-based networks are described in A Carzaniga, M. J. Rutherford, A. L. Wolf, A routing scheme for content-based networking, Department of Computer Science, University of Colorado, June 2003, the contents of which are incorporated herein by reference.

In XML or other forms of content routed networks (such as the attribute/value model of the Carzaniga et. al. paper referenced above), user data is forwarded through the network in a "headerless" fashion. That is, the XML document is forwarded at each hop by inspecting the content of the application document. Each XML router terminates an HTTP, SMTP or other protocol connection, and examines then forwards the encapsulated document. Any end-to-end information that may have been carried in underlying protocol headers is lost. This is in contrast with other routed networking protocols, such as IP, where a network layer header is preserved, with some fields possibly modified (such as the time to live field in an IP packet header) from sender to destination. This network layer header may be used by the routers along the forwarded path to mark, re-use and monitor information about the packet. This header can also be used by nodes at the edge of the network to mark the packet with "behavioral" or other information which is derived from local policy and therefore which need not be configured on each node in the network.

In the prior art, such as in the above reference "a routing scheme for content-based networking", there is an assumption that no further data is attached to a document or event which is being content-routed in a network, other than the identifier of the source node of the event. It is assumed that only the content of the event or document is used by each content router (also referred to as a message broker in the prior art) to determine where in the network the item needs to be further routed. However, attaching meta-data to an event or document (hereafter only referred to as a document) in a content routed network provides for capabilities such as robust and scalable routing (refer to co-filed application Ser. No. 60/530,615, the contents of which are incorporated herein by reference) and enhanced services such as priority differentiation for quality of service (refer to co-filed application Ser. No. 60/588,797, the contents of which are incorporated herein by reference).

Content routing networks are often built as overlay networks above an underlying network, such as an IP network. Point-to-point links are created between content routers in order to make pairs of content routers logically adjacent (although they may be separated by multiple hops in the underlying IP network). This is similar to how IP (as a connectionless packet layer) is carried on top of its many layer 2 protocols (such as SONET, Ethernet, etc. as is known in the art). The overlaying of content routing upon an underlying network technology, such as IP, necessitates support for functionality such as priority, loop prevention, tracing, etc in order to build a robust and scalable content routing solution.

SUMMARY OF THE INVENTION

The invention provides a method wherein any router may attach, examine, modify and delete meta-data to a customer document. Typically, this meta-data would be attached at the ingress router (after the document has been received from a publisher), examined and/or modified at each intermediate hop, and finally stripped from the document before delivery to the end user (subscriber).

According to the present invention there is provided a method of handling a document in a content-routed network including a plurality of content based routers interconnected by links, comprising preparing a document for transmission; creating meta-data describing at least one or more characteristics of said document; attaching said meta-data to the document; receiving the document at one or more downstream routers; analyzing the meta-data at one or more said downstream routers; and handling the received document at said one or more downstream routers in accordance with said meta-data. It will be understood that the term "document" in the context of this application is used in a general sense and includes any entity containing content, for example, including multimedia content, that is capable of being published to subscribers.

The metadata can be extracted at the ingress router, although in one embodiment some metadata can be provided to the ingress router by the publisher.

In content routed networks, the types of data which could be attached to a document fall into a number of categories;

1. Data which must be added by the ingress router, because it is the only device that can determine the correct values
2. Data which could be determined by any router via document inspection, but for which it is more efficient or network scalable to determine the data at a single point.
3. Data which must be modified by routers as the document traverses the network along the path or paths from a publisher to all interested subscribers.

The method chosen for attaching network data must should two important criteria:

1. It must be open and possible to implement by any and all content routing manufacturers. This is required to enable interoperability of devices from various vendors.
2. It must be easily extensible to add future meta-data fields.

Embodiments of the invention provide a method for adding meta-data at the beginning and/or end of content routed documents. There are two variants of this method:

Source document is XML encoded, wherein XML is Extensible Markup Language (refer to Extensible Markup Language (XML) 1.0 (Third Edition)", W3C Recommendation 04 Feb. 2004, W3C (World Wide Web Consortium) and Extensible Markup Language (XML) 1.1", W3C Recommendation 15 Apr. 2004, W3C (World Wide Web Consortium))

Source document is not XML encoded

Embodiments of the invention also provide a method for attaching a "version" meta-tag, which is valuable to allow for backwards and forwards compatibility rule checking.

The meta data can be used to enable various network services, capabilities, or robustness; examples:

A unique "publisher ID" meta-tag, which is valuable to the downstream router because it allows enforcement of publisher-subscriber security filters.

A priority meta-tag, such that documents need only be priority classified at the edge of the network; downstream routers need only read the meta-tag to determine the priority of the document in order to apply quality of service (QoS) policies to the treatment of the document (refer to co-filed application 60/588,797).

A "hops left" meta-tag, such that routers can track the number of remaining network hops that are allowed for the document. This is necessary for eliminating routing loops in the presence of transient or long lasting routing cycles.

A "traversed routers" meta-tag, which is useful for network debugging and troubleshooting.

A "address" meta-tag, which provides the address of the ingress content router, as well as the destination address of each content router that this copy of the document needs to be delivered to. The source address information helps detect routing loops (via a Reverse Path Forwarding (RPF) check), and the destination address allows for a highly scalable routing method, as described in 60/530,615.

An "entitlement group" meta-tag, which provides a list of entitlement groups which the document has been published into. This allows for the capability of a content-routed network to support virtual private networks, and to control which subscribers can received which published content.

The presence of this "meta-data" allows downstream content routers to quickly and reliably ascertain previously determined characteristics of the document, and act accordingly. The formatting of this "meta-data" is done in such a way as to permit extensibility, ease of debug, and interoperability.

In another aspect the invention provides a content-based router for use in a content-routed network including a plurality of such content based routers interconnected by links, comprising a processor configured to examine a document received from a publisher and which is to be transmitted over said content-routed network to determine one or more characteristics thereof; to attach meta-data to the document describing at least said one or more characteristics determined from examining said document; to accept, modify or remove any meta-data received from a publisher; whereby one or more subsequent routers can analyze the meta-data and handle the received document in accordance with said meta-data describing said one or more characteristics. As noted above the downstream routers may also modify the metadata.

BRIEF DESCRIPTION OF THE DRAWINGS

The invention will now be described in more detail, by way of example only, with reference to the accompanying drawings, in which:—

DETAILED DESCRIPTION OF THE PREFERRED EMBODIMENTS

Figure 1:
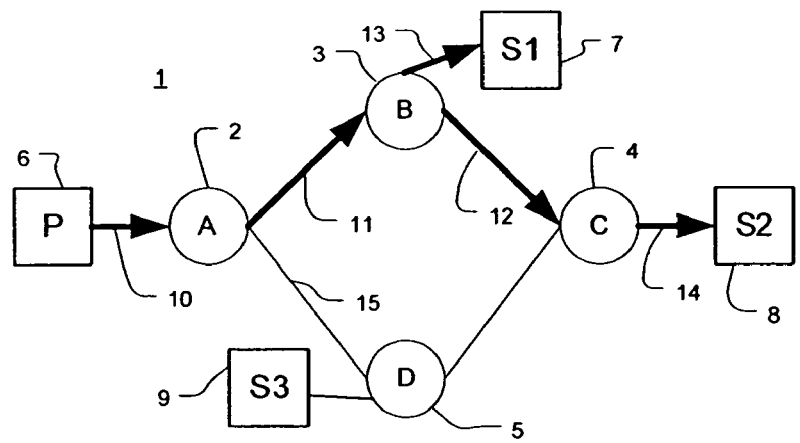
FIG. 1 shows an Example Content Routed Network.

FIG. 1 depicts an example content-routed network 1, which consists of a plurality of content routers 2, 3, 4, and 5 with respective names A, B, C and D; a publisher 6 (note that a content routed network typically will have a plurality of publishers but only one is shown in FIG. 1); a plurality of subscribers 7, 8 and 9 (note that a content routed network can contain a large number of subscribers, i.e. millions). A publisher is a computer or user that can insert content into the network. A subscriber is a computer or user who has expressed interest in some specific content. Publisher 6 publishes a document into the content routed network by sending it over link 10 to content router 2. Content router 2 matches the content of the received document-against the subscriptions for the network, which the router learned of through a content routing protocol (refer to co-filed application Ser. No. 60/530,615) or by some other means. Content router 2 determines that the document is required by one or more subscribers on content router 3 and content router 4, but not by any subscribers on content router 5. As a result, a single copy of the document is sent over link 11 to content router 3, since link 11 is the preferred path to content routers 3 and 4 in this example. Content router 3 delivers the document to all local subscribers which have matching subscriptions, which in this case is subscriber 7. So, a copy of the document is sent over link 13 to subscriber 7. In addition, the document is forwarded on to content router 4 over link 12. In a similar manner, content router 4 delivers the document to any local subscribers with matching subscriptions, which in this case is subscriber 8. Thus, the document is sent over link 14 to subscriber 8. Content router 4 also determines that no further content routers require a copy of the document. For full details of the content routing protocol used, refer to 60/530,615.

Figure 3:
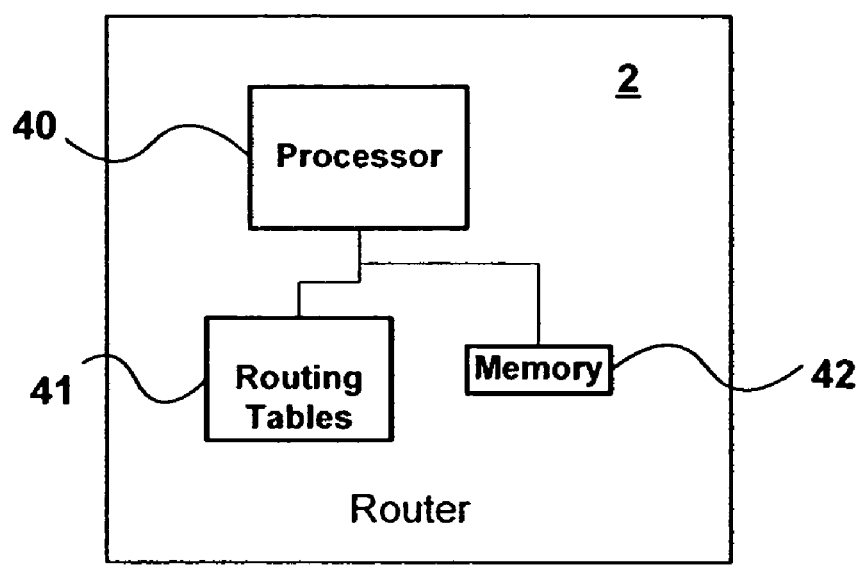
FIG. 3 is a simplified diagram of a router for implementing the method in accordance with the invention.

FIG. 3 shows a simplified diagram of a content router 2, which includes a processor 40, routing tables 41, and memory 42. The processor 40 can be configured to implement the methods described herein.

Hyper-Text Transfer Protocol (HTTP) is preferably utilized to transfer data between the content routers 2, 3, 4,5 as described in co-filed application Ser. No. 60/530,678. In this case the HTTP Universal Resource Identifier (URI) is utilized to attach meta-tags to the HTTP message carrying the document being content-routed (whether XML or any other format). The HTTP URI is defined in RFC2616, "HyperText Transfer Protocol—HTTP/1.1", June 1999; RFC1945, "Hypertext Transfer Protocol—HTTP/1.0", May 1996, and also in RFC2396, "Uniform Resource Identifiers (URI): Generic Syntax.", August 1998, all from The Internet Society.

The general form of the HTTP Universal Resource Locator (URL), which is a form of a Universal Resource Identifier (URI) is:

"http:"*"//"host[":"port][abs_path["?"query]]

The "query" portion of the URL is utilized in the preferred embodiment to carry document meta-tags between routers in a content-routed network. The format of the "query" string is given by:

[tag=value*[?tag=value]]

where * represents 0 or more instances, and [ ]encapsulates optional parameters. This allows the URI to carry zero or more meta-tags for the document carried by the HTTP message entity.

As example of a URI as it appears in an HTTP request message header, with an example absolute URI of "/host", and three meta-data fields, the first being a version number of 1.0, the second being a document priority (pri) of 2, and the last being a hops left value of 4, is:

/host?ver=1.0?pri=2?hopsLeft=4

It should be noted that in the preferred embodiment, a "?" is used to separate the various meta-data fields in the query portion of the URI. Only the portion of the URI starting with the absolute path is shown above, as the other portions have other uses in the HTTP protocol, as is known in the art. As an implementation option, other separators could be used instead, e.g. "&" as shown below:

/host?ver=1.0&pri=2&hopsLeft=4

There are seven example meta-data items defined, as summarized in Table 1 below. The usage of each of these meta-data items is described in greater detail below. Note that the "mandatory" column in Table 1 below indicates whether the specific meta-data item is considered mandatory in the preferred embodiment. However, in general, any meta-data item may or not be considered mandatory depending upon its specific use and meaning.

TABLE 1

Meta-Data Elements

| Meta Data Item | Example | Mandatory? |
| --- | --- | --- |
| Version | ver=1.0 | Yes |
| Priority | pri=2 | No |
| Hops Left | hopsLeft=4 | Yes |
| Address | addr=0100500A010203: 0100500A010205, 0100500A010206: | Yes |
| Traversed Routers | traversedRouter=0100500A010203, 0100500A010204 | No |
| Publisher ID | publisherID=1234 | No |
| Entitlement Group | entGroup=4,7 | No |

The meta-data is typically inserted by the edge (or "first hop") content router traversed by the published document. In a common scenario, content routers terminate HTTP over TCP connections, examine the contained XML document and forward the document based on the content. Forwarding consists of re-transmitting the document over one or more HTTP/TCP connections, either to adjacent content router(s), or to end subscriber(s).

Before being delivered to the end subscriber, the meta-data must be stripped from the document. This is the responsibility of the final content router that ultimately delivers the document to the end subscriber. After stripping of the meta-data, the document should be identical to that which was received from the publisher by the first hop content router. Note however, that XSLT or some other transformation technique could be used to transform the document before delivering it to the end subscriber (such as converting an XML document to an HTML document for display purposes).

Due to the multicast nature of content routing (a single published document may be delivered to multiple subscribers) the insertion and deletion stages could occur at the same router, or a single router may be required to delete the meta-data (for delivery to a subscriber(s)) and pass a copy of the document with the meta-data in place (to downstream router(s)).

Figure 2:
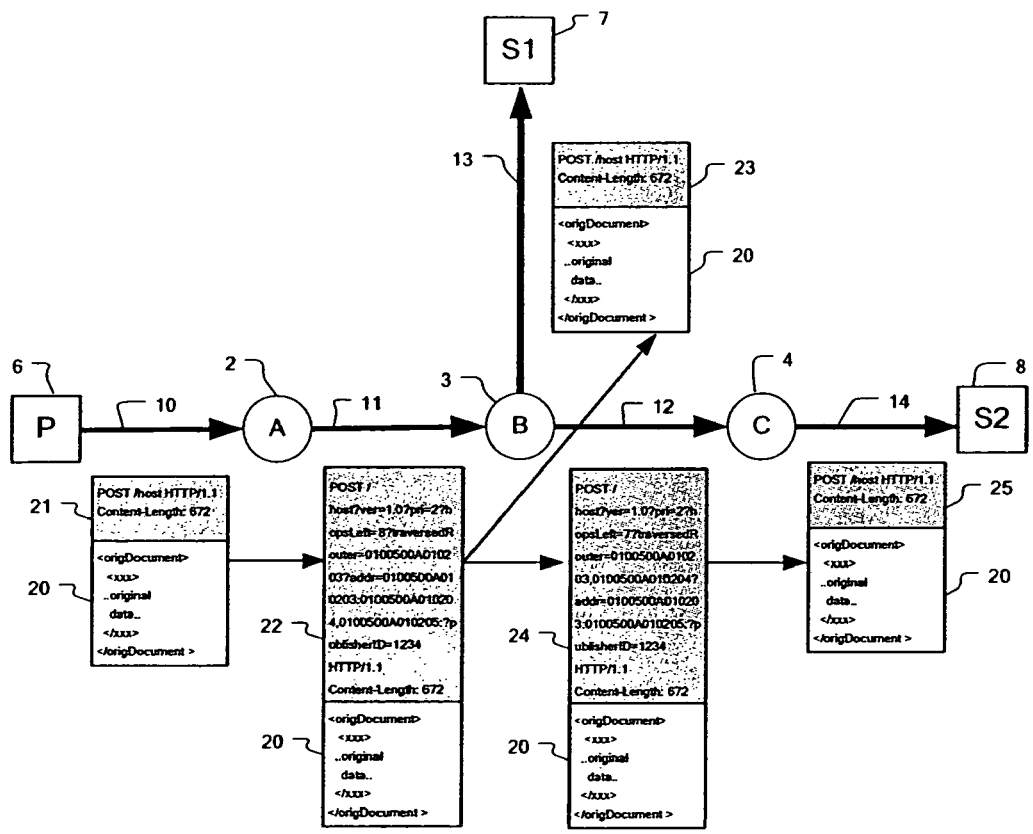
FIG. 2 shows Meta-Data Insertion and Deletion within a document traversing the network shown in FIG. 1.

FIG. 2 depicts the insertion and deletion of meta-data in the content routed network of FIG. 1, with the same example document flow. Elements common to FIG. 1 and FIG. 2 share the same labels. XML document 20 is published by publisher 6 over link 10 to content router 2. The publishing to the content router is done via an HTTP POST message, and so the document contains an HTTP header 21. Note that the header can contain more information than shown in 21, such as content type, etc, as per the HTTP specification. Note also that if a different method is used to publish a document to a content router, HTTP header 21 may not be present at all.

Content router 2 performs the content routing function described above, and determines that the document is needed by content routers 3 and 4, both of which are reachable over link 11. Content router 2 also performs document prioritization for the purpose of quality of service differentiation (refer to 60/588,797) and determines that the document priority is 2. The hops left meta-data is initialized to 8 in this example, meaning that the document is allowed to take 8 further network hops before it is blocked from being routed any further. This protects against routing loops in the network. Note that the value to be used depends on the routing dimension of the network, network policies etc. This value could be a computed value or a value set by the network administrator. The traversed router meta-data reflects the list of routers that the document has traversed. This can also be used to detect routing loops, can be used for network debugging (i.e. determining the path a document took through the network, etc.). Content router 2 places its address into this meta-data field. The document undergoes the content routing algorithm described above, and it is determined that the document is needed by content routers 3 and 4. The address of the ingress content router 2 and the address of the destination content routers 3 and 4 are indicated in the addr meta-data field. The publisher ID meta-data field is set to the unique number that represents the publisher from which the document was received. This can be used to implement policies that restrict which users can see published content from which publishers. The document is then sent over link 11, with the HTTP header 22 containing the meta-data described above, and the original document 20 which has been published.

Content router 3 receives document 20 with HTTP header 22, and uses the meta-data to perform some initial checks. The hopsLeft field is decremented. If it reaches zero, the document is discarded. Otherwise, the updated hopsLeft value is used as the document is forwarded to any further content routers. The traversed router field, if present, is checked to see if the address of content router 3 is already in the list. If so, a routing loop has occurred and the document is dropped. Otherwise, content router 3 adds its address to this list (if the traversed router field is present). Note that the traversed router field can be used to just accumulate the routers traversed (for reporting for diagnostic purposes), or just to do loop detection as described above, or both functions simultaneously.

The addr field is then examined. If content router 3's address appears in the destination list, then this address is removed from the destination list, and content router 3 must match the documents against its database of local subscriptions to determine the set of local subscribers who require a copy of the document. In this example, the document matches a subscription for subscriber 7, and so a copy of the document 20 is sent on link 13 to subscriber 7, along with an HTTP header 23. Note that all the meta-data is stripped from the HTTP header 23 since the document is going to a subscriber as opposed to another content router. The addr field is then examined to see if there are any other content routers who require the document. If the destination list is not empty, then the document is forwarded to each destination address present. Note that these addresses are those of other content routers in the network. The egress link for each destination address is determined, based on the topology information of the network (refer to 60/530,615). This determines the set of egress links on which the document must be sent, as well as the set of destination content routers reachable on each link. Note that only a single copy of the document is sent on a given link between a pair of content routers. In the example of FIG. 2, the remaining destination address is that of content router 4, which is reachable via link 12. The publisher ID field is not modified. The document 20 is then sent on link 12 to content router 4 with HTTP header 24. Notice that in HTTP header 24, relative to HTTP header 22, the hopsLeft field has been decremented by one, the addresss of content router 3 has been added to the traversedRouter field, the address of content router 3 has been removed from the destination portion of the addr field, and the version and publisherID fields remain the same. Note that the use of the addr field above is only one manner in which to perform content routing. Another method known in the art is to re-parse and match the document at each network hop.

At content router 3, the forwarding operation to downstream content routers can occur in parallel with the local matching operation to determine the set of local subscribers who require the document.

Content router 4 then receives document 20 with HTTP header 24. The above operation is repeated. The address of content router 4 appears in the destination address list, and thus the document is matched against local subscriptions, resulting in the document 20 being forwarded with HTTP header 25 over link 14 to subscriber 8. Note that content router 4 has removed all meta-data information from HTTP header 25. Since there are no further addresses in the destination address list, the document is not sent to any other content routers.

The HTTP URI parsing rules are as follows. When a document arrives on a link from an attached publisher, the router processes the document as an edge router, and adds meta-data with appropriate values for all mandatory elements before forwarding the document onwards to another router. Note that optional meta-data fields can also be added, according to policies on the router, administrative configuration, or a combination. For example, the traversedRouter meta-data may only be inserted upon configuration from an administrator to aid in debugging network problems. Inserting meta-data at ingress allows the edge router to initialize certain information which is used downstream in processing the document, such as the addr field and the priority field. For example, this allows the priority of the document to be determined at ingress based on the publisher and the contents of the document (refer to 60/588,797). It allows the ingress router to set an initial value for the number of network hops that the document can traverse on a given path. The router can also enforce that the meta-data fields are not allowed to be present when the document is first received from a publisher. In such cases, the meta-data can be stripped and ignored, or the document can be rejected, based on a local policy configuration. Alternatively, some meta-data fields could be allowed based on which publisher is sending the document again based on local policy configuration. For example, the network could allow certain publishers to set the priority of the document (pri field), instead of this being determined by the ingress content router. In this case, the pri field, if present and allowed, would be used upon receipt from the publisher instead of a value being determined by the content router.

If a document is received from another router (as opposed to from a publisher), the meta data is used and updated as described above. Note that if an optional meta-data element is not present then the content router either does not need the information (such as traversedRouter) or can use a default value. For example, if the pri meta-data is not present, the default priority value is used. The default priority value is a configurable item on the router, with a default value of 0 (lowest priority).

Upon delivery of a document to a subscriber, the default behavior is to remove all meta-data information as described above. However, some meta-data fields could be of interest to the end subscriber to whom the document is being delivered. For example, as a service, the router could provide priority information to the end subscriber indicating how the document was prioritized. In this case, all but a few select meta-data items could be removed by the router before delivery to the subscriber. This would be done via policy in the router. In addition, the meta-data could be transformed and delivered to the subscriber using a different meta-data field. As an example, the content routed network could use four priority values, 0 (lowest) through 3 (highest), and these values could be transformed to a different set of values, e.g. "low" and "high" before being delivered as meta-data information to a subscriber, using the exemplary transformation table shown in Table 2 below:

TABLE 2

Exemplary Mapping Table for priority Meta-Data

| "pri" meta-data | priority meta-value delivered to subscriber |
|---|---|
| 0 | "low" |
| 1 | "low" |
| 2 | "high" |
| 3 | "high" |

Another case is when two content routers reside in different routing areas or hierarchies, as per 60/530,615. In this case, some meta-data information may have to be recomputed and used. For example, when a document enters a routing area from another routing area, only the ingress router will appear in the destination address list, since it is serving as a proxy for all routers in the area from the perspective of the area from which the document came. From the perspective of the ingress router, the addr field must be re-computed by determining the set of content routers that require the document in the new area just entered. This addr information is then used as described above. However, other fields, such as traversedRouter, hopsLeft, priority, routerID, entGroup can maintain information across routing area boundaries. For example, the priority can apply across all areas, and the traversedRouter can record all routers in the path, across multiple routing areas. Note that alternatively, some values could be re-mapped at administrative boundaries, and mapping tables would be provisioned against an inter-network interface. This would allow, for example, priority values to be different in different administrative domains.

When a document is sent from one content router to another content router across administrative boundaries, policies can be implemented to allow the egress router at an administrative boundary to remove some meta-data information. For example, a policy may be put in place to remove the traversedRouter meta-data so that one administrative boundary does not give out information about its internal routers. In addition, the ingress router may also apply policies on what meta-data it will use from the other administrative domain. For example, the ingress router may choose to ignore the received priority value (if present) and compute it own priority value for the document, setting the priority meta-data for onwards processing. These policies are configurable for both egress and ingress at an administrative boundary.

The details of the meta-data elements defined are now described.

The use of the ver (version) meta-data is as follows. The version meta-data is used to indicate and track future evolution of the meta-data. A set of versioning rules is defined below to ensure backwards compatibility as new meta-data fields are defined and added to the header.

To ensure forwards and backwards compatibility among content routers with different generations of software, a set of simple parsing and handling rules are defined. A general rule, which permeates the specific rules, is that under no circumstances should formatting of the meta-data header lead to the discard of a customer document, unless the router is configured to do so under major version mismatch scenarios.

1. The version meta-data contains a value of the form X.Y (e.g. ver=1.0) where X and Y are decimal numbers. The X version number is used to indicate major revisions of the protocol, whereby compatibility of adjacent routers is not possible to achieve. The Y version number is used to indicate minor revisions of the protocol, whereby compatibility of adjacent routers is expected and required. The content router must compare X.Y to it's own internal implementation version P.Q, and:
   a. If X>P, the complete header is ignored, and the router forwards the document as if it were received with no meta-data header. The router must create the meta-data as if it were the ingress router, but some capabilities, such as determination of publisherID, may not be possible. As a configuration option, the router can be configured to instead reject the document and alarm the administrator that a version mismatch exists. Note that the major version number should only ever be incremented if a change is being made that is so significant that backwards-compatible behavior (as described below for a minor version number change) can not be done instead.
   b. If P>X, the router implementation must support parsing rules to examine the older header format. When forwarding the document, the router strips the old X.Y header, and inserts a P.Q revision header with appropriate values for all mandatory elements and optional elements present and still supported.
   c. If P=X, and Q>Y the router should parse the existing fields, and add additional fields that are mandatory within the "P.Q" revision of the protocol. The version meta-data should be updated to "P.Q".
   d. If P=X, and Y>Q, the router should parse the elements it recognizes, and ignore the elements that it does not recognize. The unrecognized elements should be passed through transparently when the document is forwarded. The version meta-data in the header should remain as "X.Y".

The address of a router, when appearing in a meta-data element (e.g. traversedRouter and addr), is formatted as follows:

FFPPPPAAAAAAAA where each F, P or A is an ASCII character in the range of '0' through '9' or 'A', 'B', 'C', 'D', 'E', 'F'. Each character in the string represents a 4-bit hexadecimal (base 16) digit in the range of 0 through 15 inclusive, or 0 through F in hexadecimal notation. The "FF" field represents an 8 bit binary number (in the range of 0 through 255 decimal) representing the protocol or format for the following fields. For the currently-used values of the protocol field, the "PPPP" field represents a 16-bit binary number (in the range of 0 to 65535 decimal) representing the port number (e.g. a TCP port number). The "AAAAAAAA" field represents a 32-bit binary number representing the IP version 4 address. Note that in the future other formats can be utilized, such as a longer field to hold an IP version 6 address instead of an IP version 4 address. This could be identified in one of two ways: a) assigning a new value to the FF field to represent a new encoding of the following fields, or b) using the overall length of the string to determine the size of the final address field, so that the appropriate number of digits for a smaller IPV 4 address or a large IPV6 address can be extracted. Note that on receipt the characters are treated in a case-insensitive manner, i.e. 'A' and 'a' are both treated the same.

The current assigned values for the FF field are shown in Table 3 below:

TABLE 3

Assigned Protocol Values

| Protocol Value | Meaning |
| --- | --- |
| 1 | HTTP protocol |
| 2 | TCP protocol |

As a specific example, for a protocol of HTTP, a port number of 80 (decimal), and an IP version 4 address of 10.1.2.3 (expressed in the standard decimal-dot notation), the encoded value would be: 0100500A010203.

The publisherID meta-data is used as follows. In the course of hop by hop content routing, each individual router needs to know the publisher of the document for two reasons:
1. The content routing forwarding table which determines the list of downstream interfaces for the document may contain entries which are qualified by the publisher. That is, the forwarding decision may depend on the publisher.
2. For security reasons, there may be constraints on which subscribers can receive data from specific publishers, and vice versa. For ease of configuration and network scalability reasons, these security rules may not be known to each node in the network; for example, the security rule may only be enforced at the node which is directly attached to the subscriber.

The publisherID meta-data is a globally unique number. It can be administered on a network-by-network basis with no regard to making it globally unique if this meta-data will not traverse administrative boundaries. Or, a numbering scheme can be used which is globally unique in nature. For example, a hierarchical numbering scheme can be utilized where the upper portion is administratively assigned to a network and is unique, and then each network assigns its own lower portion in a unique fashion to that specific network. In this way, each network can independently assign publisher IDs that are globally unique. Several such global numbering schemes are known in the art.

The use of hopsLeft is as follows. For connectionless routed networks, it is possible for a routing loop to exist, either for transitory periods (as routing tables converge) or for extended periods (due to implementation errors). In the presence of these routing loops, a single document can be forwarded around the loop multiple times, needlessly consuming bandwidth and CPU cycles. If no mechanism is in place to detect the presence of the routing cycle, a document could become "stuck" in a never ending loop.

To detect the occurrence of routing cycles and prevent looping, the hopsLeft meta-data element is defined. The first hop router creates the hopsLeft element with an initial value determined by a configuration parameter, or a computed value as described above. At each intermediate router, the value of hopsLeft is decremented by one. If the value ever reaches 0, the document is discarded, and an alarm is raised to notify the network administrator that a routing cycle may exist.

The hopsLeft element is formatted as a decimal numeric value, in the range from 1 . . . 255, for example: hopsLeft=5.

The use of pri (priority) is as follows. A content-routed routed network contains mechanisms for providing Quality of Service differentiation based on the content of a document, or publisher, or subscriber policies. The algorithm for identifying the QoS parameters (class of service, guaranteed bandwidth, burst bandwidth), is described in 60/588,797. It is preferable to execute the classification algorithm once, at the ingress to the network (or at the ingress to an administrative boundary) because:

1. Document classification is computationally expensive. To execute it at each router hop would be a waste of CPU cycles.
2. Configuration of the "classification rules" has associated network administration overhead, which is significantly reduced if the rules are only configured at required nodes (i.e. nodes with attached publishers where classification is required).

To achieve this, the pri element allows the results of the classification algorithm to be propagated from the ingress router to all other downstream routers in the forwarding path. Those routers can then enforce QoS behaviors based on a simple and efficient table lookup of the priority value.

In the preferred embodiment described in 60/588,797, the priority field takes on a value in the range of 0 through 3.

The value of the pri field impacts the handling of the document within the router and is propagated to the underlying IP network when it is DiffServ compliant, as described in 60/580,797.

As an alternative (or as an addition), a meta-data element could be defined to carry a Differentiated Services Code Point, as defined by the Internet Engineering Task Force (IETF), as is known in the art. An intermediate router may be required to "re-map" the value of the dscp element, and assign it a different value when transmitting, if it is transmitting the document via an IP network where the allocation of DiffServ codepoints differs from the previous link.

The use of traversedRouter is as follows. For debugging purposes, it is necessary to provide a means for tracing the path that a document takes as it traverses the network. Ideally, the traced path would identify specifically which content routers forwarded the document, in the order that they were traversed. The traversedRouter meta-data element is defined specifically for this purpose.

Formatting of the traversedRouter element is straightforward, the data is set equal to the router's assigned routerID, which is the address of the router formatted as defined above. The traversedRouter element is a list of one or more addresses, comma-separated. The list grows as the document progresses through the network. The order of the list is the order of traversal, with the first entry being the first router traversed, the Nth entry being the Nth router traversed, and the last entry being the last router that has been traversed. Via a configuration parameter or user-initiated command, the ingress router formats a traversedRouter meta-data element with just its own address in the address list, and attaches the meta-data to the HTTP URI before forwarding the document to another router. Each subsequent router, upon detection of a traversedRouter meta-data item, adds its address as an additional item to the traversedRouter list (separated by the previous address with a comma). Note at network points where the document is sent on multiple egress links to other content routers, each document has its own traversedRouter element, and these will be updated independently as the documents take separate paths through the network. For example, in FIG. 1, content router 2 may send a copy of a document over link 11 and another copy over link 15. Thus, each copy of the document progressing through the content-routed network has its own (optional) traversedRouter information to track the path of that copy of the document.

For example, the contents of the traversedRouter meta-data after a document has first passed through content router with an address of 0100500A010203, followed by a content router with an address of 0100500A010204, is:

traversedRouter=0100500A010203,0100500A010204

Additionally, the traversedRouter meta-data item can be expanded to include the egress link as well as the content router address. This allows the specific link taken out of each content router to be identified. This is useful in scenarios where content routers may be connected by more than one link. Each element in the comma-separated list in the traversedRouter data would be expanded to a pair of address and link id to accomplish this. An example encoding scheme is:

traversedRouter=address:link,address:link where address is encoded as shown above and link is a link identifier, such as a simple number or a string to identify a given egress link of a content router.

The use of entGroup (entitlement groups) is as follows. Entitlements allow more complex relationships to be established between publishers and subscribers. For example, a subscriber may be only able to access information from certain publishers (for security reasons, or to limit content to subscribers who pay for it, etc.). In addition, a publisher may produce different types of information, some which some subscribers can see and some which a possibly different set of subscribers can see. Entitlements are implemented using a unique group number. Publishers can be assigned to one or more groups, and subscribers can be assigned to one or more groups. A special reserved group number of zero indicates the global group which is the default group for all published documents that are not otherwise categorized. The absence of the entGroup meta-data also implies group zero. Note that a subscriber has to be specifically configured to accept group zero to be able to receive such a document to maintain security. Alternatively, group zero could be the default group for all subscribers, and publishers could be specifically configured to be a member of group zero if desired.

When a publisher registers with a content router, the content router assigns the publisher a set of groups, based on configuration data, which may be local to the router, or which may come from a remote configuration database, such as a Radius database or a Lightweight Directory Access Protocol (LDAP) database. This represents the groups that the publisher can publish content into. Note that the publisher registration can involve supplying a user name and password, over a secure connection such as HTTP-S, in order to determine the credentials of the publisher. In addition, the publisher may have to provide a signed certificate. Once the credentials are known, local configuration or remote configuration data can then determine the entitlements of the publisher.

When a subscriber registers with a content router, the entitlements of the subscriber are similarly determined.

As an example, Table 4 below shows a simple sample configuration for entitlements:

TABLE 4

Entitlements Example

| Name | Role | Entitlements |
| --- | --- | --- |
| P1 | Publisher | 1, 2 |
| P2 | Publisher | 2 |
| P3 | Publisher | 3 |
| S1 | Subscriber | 1 |
| S2 | Subscriber | 2 |
| S3 | Subscriber | 1, 2, 3 |

In Table 4 above, publisher P1 can publish documents into entitlement groups 1 and 2. Publisher P2 can publish documents into entitlement group 2 only. Publisher P3 can publish documents into entitlement group 3 only. Subscriber S1 can receive documents from entitlement group 1 only. Subscriber S2 can receive documents from entitlement group 2 only. Subscriber S3 can receive documents from entitlement groups 1, 2 and 3.

When a document is received from publisher P1, it is assigned entitlement groups 1 and 2, and this information is set in the entGroup meta-data as the document is forwarded to other content routers. When a content router matches a document against a subscription, the entitlements of the subscriber are consulted. There must be an intersection between the entitlement groups of the document (set based on the publisher) and the entitlement groups of the prospective recipient subscriber. In this example, subscribers S1, S2 and S3 can receive a document published by P1. However, a document published by P3 can only be received by subscriber S3. This allows a content routed network to be used by multiple organizations who may not wish to share information (virtual private networks). In addition, within a virtual private network, it can be used to limit the scope of which users can see which information.

As described above, a content router, based on policy, may accept certain meta-data from a publisher. A content router could be configured to accept the entGroup meta-data from a publisher. If the meta-data is not provided by the publisher, then the meta-data is set as described above. However, if the publisher does provide the meta-data, the content router verifies that it does not exceed the entitlements assigned to the publisher. For example, publisher P1 could provide entGroup with a value of 1 only, 2 only or 1 and 2. This allows the publisher to indicate which group or groups the particular document should be allowed for. However, if publisher P1 tried to publish a document into group 3, the content router would detect that this exceeds the entitlements. The content router could react by discarding the document and returning an error code, or accepting the document but removing any non-allowed entitlement groups. This can be a configuration option on the content router.

An example of the encoding of the entGroup meta-data to hold entitlement groups 1 and 2 is as follows. A comma-separated list is used.

entGroup=1,2

Note that the entitlement group numbers can be unique to a network, or globally unique as described above.

The use of the addr (address) field is as follows. Refer to co-filed application Ser. No. 60/530,615 for a full description of the content routing protocol and the use of a destination address list in content-routed networks. The addr (address) meta-data element allows an ingress router to specify the list of routers in the network to which the document must be routed to and processed at. This is useful if the ingress router has enough information (i.e. subscription data) for the network to determine the exact set of routers which require a copy of the document.

The addr meta-data element is formatted as follows:

addr=source:dest,dest,dest, . . . ,dest:

Where source is the address of the ingress router, formatted in the manner described above, and there is a comma-separated list of destination router addresses, each formatted as described above.

The ingress router, upon receiving a document from a publisher, matches the document against its network-wide subscription table (the content routing table is built as described in our copending application No. 60/530,615), and determines the list of routers in the network that are required to receive a copy of the document as a result. It then determines the path (or at least the next hop) to each destination router, and sends a single copy of the document over each required egress link towards a destination router or routers. At most one copy of the document is sent on a given egress link to the next-hop router. Before a copy of the document is sent on a given egress link to the next-hop router, an addr meta-data item is added to the HTTP URI. The ingress router places its own address into the source portion, and provides a list of destination routers that will be reached via the given link. For example, in FIG. 1, if router 2 has an IP address of 10.1.2.3, router 3 has an IP address of 10.1.2.4, and router 4 has an IP address of 10.1.2.5, then the document sent from router 2 on link 11 towards router 3 will have the following addr meta-data element:

addr=0100500A010203:0100500A010204,
        0100500A010205:

This reflects that router 2 was the ingress router for the document, and that both router 3 and router 4 have one or more subscribers that wish to receive the document. In the example of FIG. 2, router 2 has a subscriber 7 that wishes to receive the document, and router 4 has a subscriber 8 that wishes to receive the document.

When a document received on a link from another content router in the same routing area (i.e. as opposed to receiving it from a publisher or from a content router in a different routing area or administrative domain), then it need only perform content inspection of the document if its address appears in the received destination list. If it is in the destination list, then the content of the document is matched against its local subscription database to determine which local subscribers require a copy of the document to be delivered to them. Independently, and in parallel, the router can forward the document onwards to any other routers in the destination list. It does this as follows. First, it removes itself from the destination list (if present). If no destinations remain, the operation is complete. Otherwise, the routing table is examined for each remaining destination to determine the best next hop or egress link to the destination. This determines the set of egress links that the document should be sent on. Then, for each egress link, the addr meta-data element is modified, keeping the source the same, and placing the list of destinations that are reachable over this link. At most one copy of the document is sent on each egress link.

Note that a router may receive a document where it is not part of the address list. For example, this would be the case for router 3 in FIG. 1 if subscriber 7 did not want the document, but subscriber 8 did. In this case, router 3 simply has to route the document onwards to the listed destinations, and does not have to do any document content matching at all.

The meta-data can be used for a variety of other capabilities to further increase the robustness of the content routing solution, or to add additional capabilities. For example, a checksum meta-data item could be added which provides a checksum over the payload being routed (i.e. over the XML document being routed). This checksum could be computed in a number of ways, such as an IP-style checksum, a cyclic redundancy check calculation, etc. This checksum would be added by the ingress content router (as a document is received from a publisher), or could be added by the publisher itself. The checksum could be verified throughout the network as the document is routed, and additionally before the document is delivered to each end subscriber. Additionally, the checksum could be delivered to each end subscriber as well to allow the subscriber to verify that the document payload has not been corrupted, using the meta-data delivery to a subscriber as described above. This allows the content routed network to ensure that the document payload has not been corrupted as the document traverses the network. Even though robust means are used to transfer messages between content routers (such as using TCP), a document could still be corrupted within a content router.

As an alternative to the above embodiment, the meta-data can be attached to a document using means other than through an HTTP header. For example, HTTP may not be used as a protocol between content routers. One alternative is to attach an XML meta-data document before the XML document being carried (assuming XML is the format of the document being published into the network). The use of each meta-data item does not change, just the formatting of the item.

The use of XML to format the meta-data is referred to as XML Meta Header (XMH). An example XMH XML document is shown below, including all of the meta-data items defined above. The data encoded is as per the examples of Table 1 above.

```
<xmh ver=1.0>
    <pri>2</pri>
    <hopsLeft>4</hopsLeft>
    <addr source=0100500A010203>
        <dest>0100500A010205</dest>
        <dest>0100500A010206</dest>
    </addr>
    <traversedRouter>0100500A010203</traversedRouter>
    <traversedRouter>0100500A010204</traversedRouter>
    <publisherID>1234</publisherID>
    <entGroup>4</entGroup>
    <entGroup>7</entGroup>
</xmh>
```

It will be appreciated by those skilled in the art that there is a large variety of XML document styles that can reflect the meta-data information. For example, comma-separated lists can be used in place of repeated XML elements (e.g. entGroup). Attribute values can be used in place of text nodes within elements, etc. In addition, XML namespaces can be optionally used, for example, the <xmh> element can define a default namespace which is applied to the <xmh> element and all nested elements.

It will be appreciated that an exemplary embodiment of the invention has been described, and persons skilled in the art will appreciated that many variants are possible within the scope of the invention.

All references mentioned above are herein incorporated by reference. Reference has been made herein to copending provisional applications, which are incorporated by reference. Such incorporation by reference should also be taken to include the non-provisional applications based thereon whose serial numbers will be inserted when they become available.

We claim:

1. A computer-implemented method of forwarding a document through a content-routed network including a plurality of content based routers interconnected by links, wherein documents are forwarded through the network based on their content, comprising:

(a) receiving the document from a publisher at an ingress router;

(b) said ingress router matching the content of said document received from the publisher with subscriptions for the network in accordance with a content routing protocol to identify the address of egress routers requiring the document for distribution to subscribers attached thereto based on the content of the document as received from the publisher;

(c) said ingress router attaching a meta-data tag to the document;

(d) said meta-data tag including at least one meta-data field updatable at each router traversed by the document and representative of the progress of said document through the network;

(e) said meta-data tag further including an address meta-data field containing the address of the ingress router and the address of each said identified egress router requiring the document for distribution to subscribers attached thereto as determined by said content routing protocol;

(f) forwarding said document to downstream routers determined by said address meta-data field;

(g) receiving the document at said one or more downstream routers;

(h) reading said at least one updatable meta-data field at one or more said downstream routers;

(i) each of said one or more downstream routers performing a preliminary check by comparing the value of said updatable meta-data field with predetermined criteria to determine whether the document should be discarded prior to determining how said document should be forwarded; and (j) if the data in said meta-data field matches said predetermined criteria, discarding said document, and (k) if the data in said meta-data field does not match said predetermined criteria, determining whether the address of said downstream router appears in said address meta-data field, and if the address of said downstream router appears in said address meta-data field matching the content of said document against a database of local subscribers who require a copy of the document and forwarding the document to said local subscribers after stripping off the meta-data tag so that said local subscribers receive said document as supplied by the publisher;

(l) each of said one or more downstream routers updating said meta-data field to indicate that the document has been received by that downstream router;

(m) forwarding the document to any further downstream routers listed in said address meta-data field, and (n) repeating steps g to m at each remaining downstream router listed in said address meta-data field, and wherein said meta-data tag further comprises a "Traversed Routers" field, each router through which the document passes adds its own address to said "Traversed Routers" field, and when a downstream router reads its own address in said "Traversed Routers field", that downstream router discards the document.

2. The computer-implemented method of claim 1, wherein said document is transmitted over an HTTP connection, and said meta-data is added to an HTTP header.

3. The computer-implemented method of claim 2, wherein said meta-data tag comprises a "hops left" field determining the number of routers the document is permitted to traverse, and wherein each downstream router decrements the value of said "hops left" field as the document passes therethrough until said value reaches a predetermined value, whereupon when a particular said downstream router reads said predetermined value in said "hops left" field, that downstream router discards the document.

4. The computer-implemented method of claim 3, wherein said meta-data tag includes a field identifying the publisher of the document.

5. The computer-implemented method of claim 3, wherein said meta-data tag further comprises a priority field assigning a priority level to said document, and wherein after reading said priority field, said downstream routers use the value of said priority field to enforce quality of service policies in processing different documents.

6. The computer-implemented method of claim 1, wherein publishers and subscribers are organized into entitlement groups, each entitlement group being assigned a unique identifier, said entitlement groups determining which subscribers are permitted to receive documents from any particular publisher, and said meta-data tag further comprises an "entitlement group" field, and when a said downstream router matches a received document against a subscription, that downstream router reads said entitlement field to determine whether the corresponding matching subscriber is a member of the entitlement group identified in the entitlement group field, and only if the matching subscriber is a member of the corresponding entitlement group does the downstream router forward the document to the matching subscriber.

7. The computer-implemented method of claim 1, wherein said meta-data tag further comprises a "checksum" field, and downstream routers read the checksum field to determine whether a document has become corrupted as it traverses the network.

8. The computer-implemented method of claim 1, wherein said meta-data tag further comprises a "version" field that differentiates between old formats or semantics and a newer format or semantics of the meta-data.

9. The computer-implemented method of claim 1, wherein said document is XML encoded, and said meta-data tags are attached to said XML document.

10. The computer-implemented method of claim 9, wherein said meta tag is an XML header (XMH) that is inserted by the first content router traversed by said document.

11. The computer-implemented method of claim 10, wherein said XML header is stripped from said document by the last content router that delivers the document to a subscriber.

12. The computer-implemented method of claim 1, wherein an egress content-based router is configured to supply some of the meta-data with the document, with possible transformation, when delivering said document to an attached subscriber.

13. The computer-implemented method of claim 1, wherein an egress content-based router delivering said document to an attached subscriber is configured to remove, replace or transform some meta-data items when sending a document over a link to a different administrative domain, or when receiving a document over a link from a different administrative domain.

* * * * *